US012027132B1

(12) United States Patent
Dunn et al.

(10) Patent No.: US 12,027,132 B1
(45) Date of Patent: Jul. 2, 2024

(54) DISPLAY UNITS WITH AUTOMATED POWER GOVERNING

(71) Applicant: Manufacturing Resources International, Inc., Alpharetta, GA (US)

(72) Inventors: William Dunn, Alpharetta, GA (US); John Schuch, Buford, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 18/214,948

(22) Filed: Jun. 27, 2023

(51) Int. Cl.
*G09G 3/36* (2006.01)

(52) U.S. Cl.
CPC ......... *G09G 3/36* (2013.01); *G09G 2320/041* (2013.01); *G09G 2330/021* (2013.01)

(58) Field of Classification Search
CPC ........................................................ G09G 3/36
See application file for complete search history.

(56) References Cited

U.S. PATENT DOCUMENTS

| | | | |
|---|---|---|---|
| 4,093,355 | A | 6/1978 | Kaplit et al. |
| 4,593,978 | A | 6/1986 | Mourey et al. |
| 4,634,225 | A | 1/1987 | Haim et al. |
| 5,029,982 | A | 7/1991 | Nash |
| 5,086,314 | A | 2/1992 | Aoki et al. |
| 5,088,806 | A | 2/1992 | McCartney et al. |
| 5,162,785 | A | 11/1992 | Fagard |
| 5,247,374 | A | 9/1993 | Terada |
| 5,285,677 | A | 2/1994 | Oehler |
| 5,559,614 | A | 9/1996 | Urbish et al. |
| 5,661,374 | A | 8/1997 | Cassidy et al. |
| 5,748,269 | A | 5/1998 | Harris et al. |
| 5,767,489 | A | 6/1998 | Ferrier |
| 5,783,909 | A | 7/1998 | Hochstein |
| 5,786,801 | A | 7/1998 | Ichise |
| 5,808,418 | A | 9/1998 | Pitman et al. |
| 5,818,010 | A | 10/1998 | McCann |
| 5,952,992 | A | 9/1999 | Helms |

(Continued)

FOREIGN PATENT DOCUMENTS

| | | | |
|---|---|---|---|
| AU | 2010218083 | B2 | 10/2016 |
| AU | 2016203550 | B2 | 3/2018 |

(Continued)

OTHER PUBLICATIONS

Novitsky, T. et al., Design How-to, Driving LEDs versus CCFLs for LCD backlighting, EE Times, Nov. 12, 2007, 6 pages, AspenCore.

(Continued)

*Primary Examiner* — Gustavo Polo
(74) *Attorney, Agent, or Firm* — Standley Law Group LLP; Jeffrey S. Standley; Adam J. Smith

(57) ABSTRACT

Display units with automated power governing features and related systems and methods are disclosed. A control subsystem is in electronic communication with a power subsystem electrically connected to an electronic display, temperature sensors, and a thermal management subsystem for the display unit. The control subsystem includes at least one governor which monitors external power supply and internal power demand, and where either of the external power supply or internal demand exceeds respective predetermined thresholds, commands reduction to power levels of the electronic display.

16 Claims, 4 Drawing Sheets

(56) References Cited

U.S. PATENT DOCUMENTS

| | | | |
|---|---|---|---|
| 5,991,153 | A | 11/1999 | Heady et al. |
| 6,085,152 | A | 7/2000 | Doerfel |
| 6,089,751 | A | 7/2000 | Conover et al. |
| 6,144,359 | A | 11/2000 | Grave |
| 6,153,985 | A | 11/2000 | Grossman |
| 6,157,143 | A | 12/2000 | Bigio et al. |
| 6,157,432 | A | 12/2000 | Helbing |
| 6,181,070 | B1 | 1/2001 | Dunn et al. |
| 6,191,839 | B1 | 2/2001 | Briley et al. |
| 6,259,492 | B1 | 7/2001 | Imoto et al. |
| 6,292,228 | B1 | 9/2001 | Cho |
| 6,297,859 | B1 | 10/2001 | George |
| 6,380,853 | B1 | 4/2002 | Long et al. |
| 6,388,388 | B1 | 5/2002 | Weindorf et al. |
| 6,400,101 | B1 | 6/2002 | Biebl et al. |
| 6,417,900 | B1 | 7/2002 | Shin et al. |
| 6,496,236 | B1 | 12/2002 | Cole et al. |
| 6,509,911 | B1 | 1/2003 | Shimotono |
| 6,535,266 | B1 | 3/2003 | Nemeth et al. |
| 6,556,258 | B1 | 4/2003 | Yoshida et al. |
| 6,628,355 | B1 | 9/2003 | Takahara |
| 6,701,143 | B1 | 3/2004 | Dukach et al. |
| 6,712,046 | B2 | 3/2004 | Nakamichi |
| 6,753,661 | B2 | 6/2004 | Muthu et al. |
| 6,753,842 | B1 | 6/2004 | Williams et al. |
| 6,762,741 | B2 | 7/2004 | Weindorf |
| 6,798,341 | B1 | 9/2004 | Eckel et al. |
| 6,809,718 | B2 | 10/2004 | Wei et al. |
| 6,812,851 | B1 | 11/2004 | Dukach et al. |
| 6,813,375 | B2 | 11/2004 | Armato, III et al. |
| 6,839,104 | B2 | 1/2005 | Taniguchi et al. |
| 6,850,209 | B2 | 2/2005 | Mankins et al. |
| 6,885,412 | B2 | 4/2005 | Ohnishi et al. |
| 6,886,942 | B2 | 5/2005 | Okada et al. |
| 6,891,135 | B2 | 5/2005 | Pala et al. |
| 6,943,768 | B2 | 9/2005 | Cavanaugh et al. |
| 6,982,686 | B2 | 1/2006 | Miyachi et al. |
| 6,996,460 | B1 | 2/2006 | Krahnstoever et al. |
| 7,015,470 | B2 | 3/2006 | Faytlin et al. |
| 7,038,186 | B2 | 5/2006 | De Brabander et al. |
| 7,064,733 | B2 | 6/2006 | Cok et al. |
| 7,083,285 | B2 | 8/2006 | Hsu et al. |
| 7,136,076 | B2 | 11/2006 | Evanicky et al. |
| 7,174,029 | B2 | 2/2007 | Agostinelli et al. |
| 7,176,640 | B2 | 2/2007 | Tagawa |
| 7,236,154 | B1 | 6/2007 | Kerr et al. |
| 7,307,614 | B2 | 12/2007 | Vinn |
| 7,324,080 | B1 | 1/2008 | Hu et al. |
| 7,330,002 | B2 | 2/2008 | Joung |
| 7,354,159 | B2 | 4/2008 | Nakamura et al. |
| 7,447,018 | B2 | 11/2008 | Lee et al. |
| 7,474,294 | B2 | 1/2009 | Leo et al. |
| 7,480,042 | B1 | 1/2009 | Phillips et al. |
| 7,518,600 | B2 | 4/2009 | Lee |
| 7,595,785 | B2 | 9/2009 | Jang |
| 7,639,220 | B2 | 12/2009 | Yoshida et al. |
| 7,659,676 | B2 | 2/2010 | Hwang |
| 7,692,621 | B2 | 4/2010 | Song |
| 7,724,247 | B2 | 5/2010 | Yamazaki et al. |
| 7,795,574 | B2 | 9/2010 | Kennedy et al. |
| 7,795,821 | B2 | 9/2010 | Jun |
| 7,800,706 | B2 | 9/2010 | Kim et al. |
| 7,804,477 | B2 | 9/2010 | Sawada et al. |
| 7,982,706 | B2 | 7/2011 | Ichikawa et al. |
| 8,087,787 | B2 | 1/2012 | Medin |
| 8,111,371 | B2 | 2/2012 | Suminoe et al. |
| 8,125,163 | B2 | 2/2012 | Dunn et al. |
| 8,144,110 | B2 | 3/2012 | Huang |
| 8,175,841 | B2 | 5/2012 | Ooghe |
| 8,194,031 | B2 | 6/2012 | Yao et al. |
| 8,248,203 | B2 | 8/2012 | Hanwright et al. |
| 8,319,936 | B2 | 11/2012 | Yoshida et al. |
| 8,325,057 | B2 | 12/2012 | Salter |
| 8,352,758 | B2 | 1/2013 | Atkins et al. |
| 8,508,155 | B2 | 8/2013 | Schuch |
| 8,569,910 | B2 | 10/2013 | Dunn et al. |
| 8,605,121 | B2 | 12/2013 | Chu et al. |
| 8,643,589 | B2 | 2/2014 | Wang |
| 8,700,226 | B2 | 4/2014 | Schuch et al. |
| 8,797,372 | B2 | 8/2014 | Liu |
| 8,810,501 | B2 | 8/2014 | Budzelaar et al. |
| 8,823,630 | B2 | 9/2014 | Roberts et al. |
| 8,829,815 | B2 | 9/2014 | Dunn et al. |
| 8,895,836 | B2 | 11/2014 | Amin et al. |
| 8,901,825 | B2 | 12/2014 | Reed |
| 8,982,013 | B2 | 3/2015 | Sako et al. |
| 8,983,385 | B2 | 3/2015 | Macholz |
| 8,988,011 | B2 | 3/2015 | Dunn |
| 9,030,129 | B2 | 5/2015 | Dunn et al. |
| 9,167,655 | B2 | 10/2015 | Dunn et al. |
| 9,286,020 | B2 | 3/2016 | Dunn et al. |
| 9,400,192 | B1 | 7/2016 | Salser, Jr. et al. |
| 9,448,569 | B2 | 9/2016 | Schuch et al. |
| 9,451,060 | B1 | 9/2016 | Bowers et al. |
| 9,445,470 | B2 | 11/2016 | Wang et al. |
| 9,516,485 | B1 | 12/2016 | Bowers et al. |
| 9,536,325 | B2 | 1/2017 | Bray et al. |
| 9,622,392 | B1 | 4/2017 | Bowers et al. |
| 9,629,287 | B2 | 4/2017 | Dunn |
| 9,799,306 | B2 | 10/2017 | Dunn et al. |
| 9,867,253 | B2 | 1/2018 | Dunn et al. |
| 9,881,528 | B2 | 1/2018 | Dunn |
| 9,924,583 | B2 | 3/2018 | Schuch et al. |
| 10,194,562 | B2 | 1/2019 | Shelnutt et al. |
| 10,255,884 | B2 | 4/2019 | Dunn et al. |
| 10,321,549 | B2 | 6/2019 | Schuch et al. |
| 10,409,544 | B2 | 9/2019 | Park et al. |
| 10,412,816 | B2 | 9/2019 | Schuch et al. |
| 10,440,790 | B2 | 10/2019 | Dunn et al. |
| 10,506,738 | B2 | 12/2019 | Dunn |
| 10,578,658 | B2 | 3/2020 | Dunn et al. |
| 10,586,508 | B2 | 3/2020 | Dunn |
| 10,593,255 | B2 | 3/2020 | Schuch et al. |
| 10,607,520 | B2 | 3/2020 | Schuch et al. |
| 10,782,276 | B2 | 9/2020 | Dunn et al. |
| 10,795,413 | B1 | 10/2020 | Dunn |
| 10,803,783 | B2 | 10/2020 | Wang et al. |
| 10,858,886 | B2 | 12/2020 | Fasi et al. |
| 10,860,141 | B2 | 12/2020 | Wang et al. |
| 11,016,547 | B2 | 5/2021 | Whitehead et al. |
| 11,022,635 | B2 | 6/2021 | Dunn et al. |
| 11,032,923 | B2 | 6/2021 | Dunn et al. |
| 11,132,715 | B2 | 9/2021 | Menendez et al. |
| 11,293,908 | B2 | 4/2022 | Dunn et al. |
| 11,526,044 | B2 | 12/2022 | Dunn |
| 11,540,418 | B2 | 12/2022 | Dunn et al. |
| 11,656,255 | B2 | 5/2023 | Dunn et al. |
| 2002/0009978 | A1 | 1/2002 | Dukach et al. |
| 2002/0020090 | A1 | 2/2002 | Sanders |
| 2002/0050974 | A1 | 5/2002 | Rai et al. |
| 2002/0065046 | A1 | 5/2002 | Mankins et al. |
| 2002/0084891 | A1 | 7/2002 | Mankins et al. |
| 2002/0101553 | A1 | 8/2002 | Enomoto et al. |
| 2002/0112026 | A1 | 8/2002 | Fridman et al. |
| 2002/0126248 | A1 | 9/2002 | Yoshida |
| 2002/0154138 | A1 | 10/2002 | Wada et al. |
| 2002/0164962 | A1 | 11/2002 | Mankins et al. |
| 2002/0167637 | A1 | 11/2002 | Burke et al. |
| 2002/0190972 | A1 | 12/2002 | Ven de Van |
| 2003/0007109 | A1 | 1/2003 | Park |
| 2003/0088832 | A1 | 5/2003 | Agostinelli et al. |
| 2003/0122810 | A1 | 7/2003 | Tsirkel et al. |
| 2003/0204342 | A1 | 10/2003 | Law et al. |
| 2003/0214242 | A1 | 11/2003 | Berg-johansen |
| 2003/0230991 | A1 | 12/2003 | Muthu et al. |
| 2004/0032382 | A1 | 2/2004 | Cok et al. |
| 2004/0036622 | A1 | 2/2004 | Dukach et al. |
| 2004/0036697 | A1 | 2/2004 | Kim et al. |
| 2004/0036834 | A1 | 2/2004 | Ohnishi et al. |
| 2004/0113044 | A1 | 6/2004 | Ishiguchi |
| 2004/0165139 | A1 | 8/2004 | Anderson et al. |
| 2004/0201547 | A1 | 10/2004 | Takayama |
| 2004/0243940 | A1 | 12/2004 | Lee et al. |
| 2005/0012734 | A1 | 1/2005 | Johnson et al. |

(56) References Cited

U.S. PATENT DOCUMENTS

2005/0024538 A1 2/2005 Park et al.
2005/0043907 A1 2/2005 Eckel et al.
2005/0049729 A1 3/2005 Culbert et al.
2005/0073518 A1 4/2005 Bontempi
2005/0094391 A1 5/2005 Campbell et al.
2005/0127796 A1 6/2005 Olesen et al.
2005/0140640 A1 6/2005 Oh et al.
2005/0184983 A1 8/2005 Brabander et al.
2005/0231457 A1 10/2005 Yamamoto et al.
2005/0242741 A1 11/2005 Shiota et al.
2006/0007107 A1 1/2006 Ferguson
2006/0022616 A1 2/2006 Furukawa et al.
2006/0038511 A1 2/2006 Tagawa
2006/0049533 A1 3/2006 Kamoshita
2006/0087521 A1 4/2006 Chu et al.
2006/0125773 A1 6/2006 Ichikawa et al.
2006/0130501 A1 6/2006 Singh et al.
2006/0197474 A1 9/2006 Olsen
2006/0197735 A1 9/2006 Vuong et al.
2006/0214904 A1 9/2006 Kimura et al.
2006/0215044 A1 9/2006 Masuda et al.
2006/0220571 A1 10/2006 Howell et al.
2006/0238531 A1 10/2006 Wang
2006/0244702 A1 11/2006 Yamazaki et al.
2007/0013828 A1 1/2007 Cho et al.
2007/0047808 A1 3/2007 Choe et al.
2007/0152949 A1 7/2007 Sakai
2007/0153117 A1 7/2007 Lin et al.
2007/0171647 A1 7/2007 Artwohl et al.
2007/0173297 A1 7/2007 Cho et al.
2007/0200513 A1 8/2007 Ha et al.
2007/0222730 A1 9/2007 Kao et al.
2007/0230167 A1 10/2007 McMahon et al.
2007/0242153 A1 10/2007 Tang et al.
2007/0247594 A1 10/2007 Tanaka
2007/0268234 A1 11/2007 Wakabayashi et al.
2007/0268241 A1 11/2007 Nitta et al.
2007/0273624 A1 11/2007 Geelen
2007/0279369 A1 12/2007 Yao et al.
2007/0291198 A1 12/2007 Shen
2007/0297163 A1 12/2007 Kim et al.
2007/0297172 A1 12/2007 Furukawa et al.
2008/0019147 A1 1/2008 Erchak et al.
2008/0055297 A1 3/2008 Park
2008/0074382 A1 3/2008 Lee et al.
2008/0078921 A1 4/2008 Yang et al.
2008/0084166 A1 4/2008 Tsai
2008/0111958 A1 5/2008 Kleverman et al.
2008/0136770 A1 6/2008 Peker et al.
2008/0143187 A1 6/2008 Hoekstra et al.
2008/0151082 A1 6/2008 Chan
2008/0165203 A1 7/2008 Pantfoerder
2008/0170031 A1 7/2008 Kuo
2008/0176345 A1 7/2008 Yu et al.
2008/0185976 A1 8/2008 Dickey et al.
2008/0204375 A1 8/2008 Shin et al.
2008/0218501 A1 9/2008 Diamond
2008/0224892 A1 9/2008 Bogolea et al.
2008/0230497 A1 9/2008 Strickland et al.
2008/0246871 A1 10/2008 Kupper et al.
2008/0259198 A1 10/2008 Chen et al.
2008/0266554 A1 10/2008 Sekine et al.
2008/0278099 A1 11/2008 Bergfors et al.
2008/0278100 A1 11/2008 Hwang
2008/0303918 A1 12/2008 Keithley
2009/0009997 A1 1/2009 Sanfilippo et al.
2009/0033612 A1 2/2009 Roberts et al.
2009/0079416 A1 3/2009 Vinden et al.
2009/0085859 A1 4/2009 Song
2009/0091634 A1 4/2009 Kennedy et al.
2009/0104989 A1 4/2009 Williams et al.
2009/0109129 A1 4/2009 Cheong et al.
2009/0135167 A1 5/2009 Sakai et al.
2009/0152445 A1 6/2009 Gardner, Jr.
2009/0278766 A1 11/2009 Sako et al.
2009/0284457 A1 11/2009 Botzas et al.
2009/0289968 A1 11/2009 Yoshida
2010/0033413 A1 2/2010 Song et al.
2010/0039366 A1 2/2010 Hardy
2010/0039414 A1 2/2010 Bell
2010/0039440 A1 2/2010 Tanaka et al.
2010/0060861 A1 3/2010 Medin
2010/0066484 A1 3/2010 Hanwright et al.
2010/0177750 A1 7/2010 Essinger et al.
2010/0194725 A1 8/2010 Yoshida et al.
2010/0231602 A1 9/2010 Huang
2010/0237697 A1 9/2010 Dunn et al.
2010/0253660 A1 10/2010 Hashimoto
2011/0032285 A1 2/2011 Yao et al.
2011/0032489 A1 2/2011 Kimoto et al.
2011/0050738 A1 3/2011 Fujioka et al.
2011/0058326 A1 3/2011 Idems et al.
2011/0074737 A1 3/2011 Hsieh et al.
2011/0074803 A1 3/2011 Kerofsky
2011/0102630 A1 5/2011 Rukes
2011/0148904 A1 6/2011 Kotani
2011/0163691 A1 7/2011 Dunn
2011/0175872 A1 7/2011 Chuang et al.
2011/0193872 A1 8/2011 Biernath et al.
2011/0231676 A1 9/2011 Atkins et al.
2011/0260534 A1 10/2011 Rozman et al.
2011/0279426 A1 11/2011 Imamura et al.
2011/0283199 A1 11/2011 Schuch et al.
2012/0075362 A1 3/2012 Ichioka et al.
2012/0081279 A1 4/2012 Greenebaum et al.
2012/0176420 A1 7/2012 Liu
2012/0182278 A1 7/2012 Ballestad
2012/0212520 A1 8/2012 Matsui et al.
2012/0252495 A1 10/2012 Moeglein et al.
2012/0268436 A1 10/2012 Chang
2012/0269382 A1 10/2012 Kiyohara et al.
2012/0284547 A1 11/2012 Culbert et al.
2013/0027370 A1 1/2013 Dunn et al.
2013/0070567 A1 3/2013 Marzouq
2013/0098425 A1 4/2013 Amin et al.
2013/0113973 A1 5/2013 Miao
2013/0158730 A1 6/2013 Yasuda et al.
2013/0278868 A1 10/2013 Dunn et al.
2013/0279090 A1 10/2013 Brandt
2013/0344794 A1 12/2013 Shaw et al.
2014/0002747 A1 1/2014 Macholz
2014/0132796 A1 5/2014 Prentice et al.
2014/0139116 A1 5/2014 Reed
2014/0184980 A1 7/2014 Onoue
2014/0190240 A1 7/2014 He et al.
2014/0204452 A1 7/2014 Branson
2014/0232709 A1 8/2014 Dunn et al.
2014/0293605 A1 10/2014 Chemel et al.
2014/0365965 A1 12/2014 Bray et al.
2015/0062892 A1 3/2015 Krames et al.
2015/0070337 A1 3/2015 Bell et al.
2015/0310313 A1 10/2015 Murayama et al.
2015/0319882 A1 11/2015 Dunn et al.
2015/0346525 A1 12/2015 Wolf et al.
2015/0348460 A1 12/2015 Cox et al.
2016/0037606 A1 4/2016 Dunn et al.
2016/0162297 A1 6/2016 Shao
2016/0198545 A1 7/2016 Dunn et al.
2016/0293142 A1 10/2016 Bowden et al.
2016/0334811 A1 11/2016 Marten
2016/0335698 A1 11/2016 Jones et al.
2016/0338181 A1 11/2016 Schuch et al.
2016/0338182 A1 11/2016 Schuch et al.
2016/0358530 A1 12/2016 Schuch et al.
2016/0358538 A1 12/2016 Schuch et al.
2017/0111486 A1 4/2017 Bowers et al.
2017/0111520 A1 4/2017 Bowers et al.
2017/0168295 A1 6/2017 Iwami
2018/0012565 A1 1/2018 Dunn
2018/0040297 A1 2/2018 Dunn et al.
2018/0042134 A1 2/2018 Dunn et al.
2018/0088368 A1 3/2018 Notoshi et al.
2018/0129461 A1 5/2018 Kim-Whitty
2018/0132327 A1 5/2018 Dunn et al.

(56) References Cited

U.S. PATENT DOCUMENTS

| | | | |
|---|---|---|---|
| 2018/0203475 | A1 | 7/2018 | Van Derven et al. |
| 2018/0206316 | A1 | 7/2018 | Schuch et al. |
| 2019/0021189 | A1 | 1/2019 | Kim et al. |
| 2019/0237045 | A1 | 8/2019 | Dunn et al. |
| 2019/0339312 | A1 | 11/2019 | Dunn et al. |
| 2019/0383778 | A1 | 12/2019 | Dunn et al. |
| 2020/0012116 | A1 | 1/2020 | Fuerst et al. |
| 2020/0150162 | A1 | 5/2020 | Dunn et al. |
| 2020/0211505 | A1 | 7/2020 | Dunn |
| 2020/0294401 | A1 | 9/2020 | Kerecsen |
| 2020/0378939 | A1 | 12/2020 | Dunn et al. |
| 2021/0034101 | A1 | 2/2021 | Mldiz et al. |
| 2021/0035494 | A1 | 2/2021 | Mldiz et al. |
| 2021/0263082 | A1 | 8/2021 | Dunn et al. |
| 2021/0302779 | A1 | 9/2021 | Dunn |
| 2022/0121255 | A1 | 4/2022 | Wang et al. |
| 2022/0187266 | A1 | 6/2022 | Dunn et al. |
| 2022/0295666 | A1 | 9/2022 | Dunn et al. |
| 2023/0060966 | A1 | 3/2023 | Dunn |

FOREIGN PATENT DOCUMENTS

| | | | |
|---|---|---|---|
| AU | 2016262614 | B2 | 1/2019 |
| AU | 2016308187 | B2 | 2/2020 |
| CA | 2754371 | C | 11/2017 |
| CA | 2849902 | C | 2/2019 |
| CA | 2985673 | C | 3/2021 |
| EP | 0313331 | B1 | 2/1994 |
| EP | 1686777 | A1 | 8/2006 |
| EP | 2299723 | A1 | 3/2011 |
| EP | 2401738 | A2 | 1/2012 |
| EP | 2769376 | A1 | 8/2014 |
| EP | 2577389 | B1 | 5/2017 |
| EP | 3295452 | A1 | 3/2018 |
| EP | 2401738 | B1 | 5/2018 |
| EP | 3338273 | A1 | 6/2018 |
| GB | 2369730 | A | 5/2002 |
| JP | 3-153212 | A | 7/1991 |
| JP | 5-18767 | A | 1/1993 |
| JP | 8193727 | A | 7/1996 |
| JP | 8-338981 | A | 12/1996 |
| JP | 11-160727 | A | 6/1999 |
| JP | 2000122575 | A | 4/2000 |
| JP | 2004325629 | A | 11/2004 |
| JP | 2005-148490 | A | 6/2005 |
| JP | 2005265922 | A | 9/2005 |
| JP | 2005-338266 | A | 12/2005 |
| JP | 2006-106345 | A | 4/2006 |
| JP | 2006-145890 | A | 6/2006 |
| JP | 2006318733 | A | 11/2006 |
| JP | 2007003638 | A | 1/2007 |
| JP | 2007322718 | A | 12/2007 |
| JP | 2008-34841 | A | 2/2008 |
| JP | 2008-83290 | A | 4/2008 |
| JP | 2008122695 | A | 5/2008 |
| JP | 2009031622 | A | 2/2009 |
| JP | 2010-181487 | A | 8/2010 |
| JP | 2010-282109 | A | 12/2010 |
| JP | 2011-59543 | A | 3/2011 |
| JP | 2014-149485 | A | 8/2014 |
| JP | 2018-523148 | A | 8/2018 |
| JP | 2018-525650 | A | 9/2018 |
| KR | 10-2006-0016469 | A | 2/2006 |
| KR | 10-0768584 | B1 | 10/2007 |
| KR | 10-2008-0000144 | A | 1/2008 |
| KR | 10-2008-0013592 | A | 2/2008 |
| KR | 10-2008-0086245 | A | 9/2008 |
| KR | 10-2009-0014903 | A | 2/2009 |
| KR | 10-2010-0019246 | A | 2/2010 |
| KR | 10-2011-0125249 | A | 11/2011 |
| KR | 10-2014-0054747 | A | 5/2014 |
| KR | 10-1759265 | B1 | 7/2017 |
| KR | 10-1931733 | B1 | 12/2018 |
| KR | 10-2047433 | B1 | 11/2019 |
| KR | 10-2130667 | B1 | 6/2020 |
| WO | 2008/050402 | A1 | 5/2008 |
| WO | 2010/141739 | A2 | 12/2010 |
| WO | 2011/052331 | A1 | 5/2011 |
| WO | 2011/130461 | A2 | 10/2011 |
| WO | 2011/150078 | A2 | 12/2011 |
| WO | 2013/044245 | A1 | 3/2013 |
| WO | 2016/183576 | A1 | 11/2016 |
| WO | 2017/031237 | A1 | 2/2017 |
| WO | 2017/210317 | A1 | 12/2017 |
| WO | 2018/009917 | A1 | 1/2018 |
| WO | 2019/241546 | A1 | 12/2019 |
| WO | 2020/081687 | A1 | 4/2020 |
| WO | 2022/197617 | A1 | 9/2022 |

OTHER PUBLICATIONS

Vogler, A. et al., Photochemistry and Beer, Journal of Chemical Education, Jan. 1982, pp. 25-27, vol. 59, No. 1.

Zeeff, T.M. et al., Abstract of EMC analysis of 18" LCD Monitor, Electromagnetic Compatibility, IEEE International Symposium, Aug. 21-25, 2000, vol. 1, 1 page.

Lee, X., What is Gamma Correction in Images and Videos?, http://xahlee.info/img/what_is_gamma_correction.html, Feb. 24, 2010, 4 pages.

Hoober, S. et al., Designing Mobile Interfaces, 2012, pp. 519-521, O'Reilly Media.

Outdoorlink, Inc., SmartLink Website User Manual, http://smartlink.outdoorlinkinc.com/docs/SmartLinkWebsiteUserManual.pdf, 2017, 33 pages.

Outdoorlink, Inc., SmartLink One, One Relay, http://smartlinkcontrol.com/billboard/one-relay/, retrieved Apr. 17, 2019, 2007-16, 6 pages.

Outdoorlink, Inc., SmartLink One Out of Home Media Controller, 2016, 1 page.

Rouaissia, C., Adding Proximity Detection to a Standard Analog-Resistive Touchscreen, SID 2012 Digest, 2012, 1564-1566, p. 132.

DISPLAY UNITS WITH AUTOMATED POWER GOVERNING

CROSS-REFERENCE TO RELATED APPLICATIONS

This application is filed as original and makes no priority claim.

TECHNICAL FIELD

Exemplary embodiments relate generally to display units with automated power governing as well as systems and methods related to the same.

BACKGROUND AND SUMMARY OF THE INVENTION

Digital out of home advertising has grown in recent years, and continues to be a major source of interest, not only for advertising, but also for other public announcements, various marketing and other services, "smart city" services, telecommunication services, and the like. These units are exposed to a wide variety of operating conditions (e.g., weather, user, and/or environment based) and demands (e.g., usage and/or programmed operational parameters). It is known to provide electronic displays in ruggedized enclosures, such as with thermal management and/or remote monitoring and/or control functions, to provide survivability and adaptability of such units under such demanding conditions. For example, it is known to limit alternating current (AC) draw on various electronic devices. It is also known to limit direct current (DC) draw on various electronic devices. It is also known to set thermal limits on various electronic devices where conditions are changed in response to meeting the thermal limit. However, current solutions fail to gracefully control such units in a fashion which exerts sufficient automated control to prevent or limit disruptions to user experiences while also safeguarding units from failure. What is needed is a power governing control system which reliably and operably controls such units to reduce or prevent failure while also minimizing disruption to user experience.

Units with power governing control systems which reliably control such units to reduce or prevent failure while also minimizing disruption to user experience are provided, along with systems and methods related to the same. Units may include one or more electronic displays. The units may include a control system with one or more of: an AC governor, a DC governor, and a thermal governor. The control system may be electrically interposed between a power source (e.g., external utility power supply) for the unit and some or all electricity consuming components of the unit (e.g., electronic displays, thermal management systems, customer equipment, peripheral equipment, combinations thereof, or the like). The governors may operably control illumination sources for the electronic displays, such as the backlights.

For the AC governor, where an AC current threshold is met or exceeded, the AC governor may operate in an AC current mitigation mode, such as by reducing power supplied to the illumination sources and/or other electricity consuming components rapidly, such as in a matter of seconds, and/or less than one second. The AC current threshold may be set relative to service rated current, such as between 70%-99% of the service rating. Power levels may be automatically increased where the AC current threshold is no longer met.

One or more circuit breakers or the like may be electrically interposed between the power source for the unit and some or all electricity consuming components of the unit to serve as a backup in case of continued AC current increase. The AC current threshold may be set to below the circuit breaker ratings, such as at 70%-99% thereof. AC current input may be monitored by the control system and electronic notifications may be generated and/or transmitted to remote device(s) where the AC current input is below a predetermined threshold, such as an expected current input or a margin thereof.

For the DC governor, where a DC current demand threshold is met or exceeded, the DC governor may operate in a DC current mitigation mode such as by reducing, at a relatively moderate rate, such as in a matter of multiple seconds or minutes, power to the illumination sources and/or other electricity consuming components, such as down to a zero level. Power levels may be automatically increased where the DC current threshold is no longer met.

Where one or more service limits of DC power supplies are met or exceeded, which may be a threshold above the DC current demand threshold, the DC power supplies may be automatically shut off and begin a restart sequence.

For the thermal governor, where the thermal management system of a unit is at maximum capacity or some other threshold capacity (e.g., 70-99% thereof), and any one or more internal temperatures, such as measuring by one or more temperature sensors in electronic communication with the control system, the thermal governor may operate in a thermal mitigation mode, such as by reducing to relatively slow, such as over a matter of several minutes, reduce power provided to the illumination sources, such as down to a zero level. Power levels may be automatically increased where the DC current threshold is no longer met, such as over a period of a same or different number of minutes.

The power adjustments shown and/or described herein, such as by the AC, DC, and/or thermal governors may be provided on various bases, such as but not limited to, on a linear, exponential and/or the like basis relative to the respective threshold(s). A grace value may be set such that the governors are configured to remain within the various mitigation modes unless/until the relevant values pass the respective thresholds by at least a predetermined amount. This may reduce or prevent rapid and frequent transitions between the normal mode and mitigation mode(s).

The governors may be operated independently and may independently provide benefits for reducing or eliminating failures and interruptions to user experiences. Analysis of measures against thresholds for each governor may be performed in parallel or in any sequence. The combination and operation of the governors, in particular, may provide exceptional reduction or elimination of failures and interruptions to user experiences. The integrated safety feature may alternatively, or additionally, permit the reduction in power supplies for a unit and/or reduce power consumption for a unit, among other benefits. This may allow provided power supplies to operate closer to capacity, whereby increased efficiencies are generally found. A centralized control system may prioritize received requests from the governor(s) for operational changes, such as but not limited to, by prioritizing the largest reductions to illumination levels.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
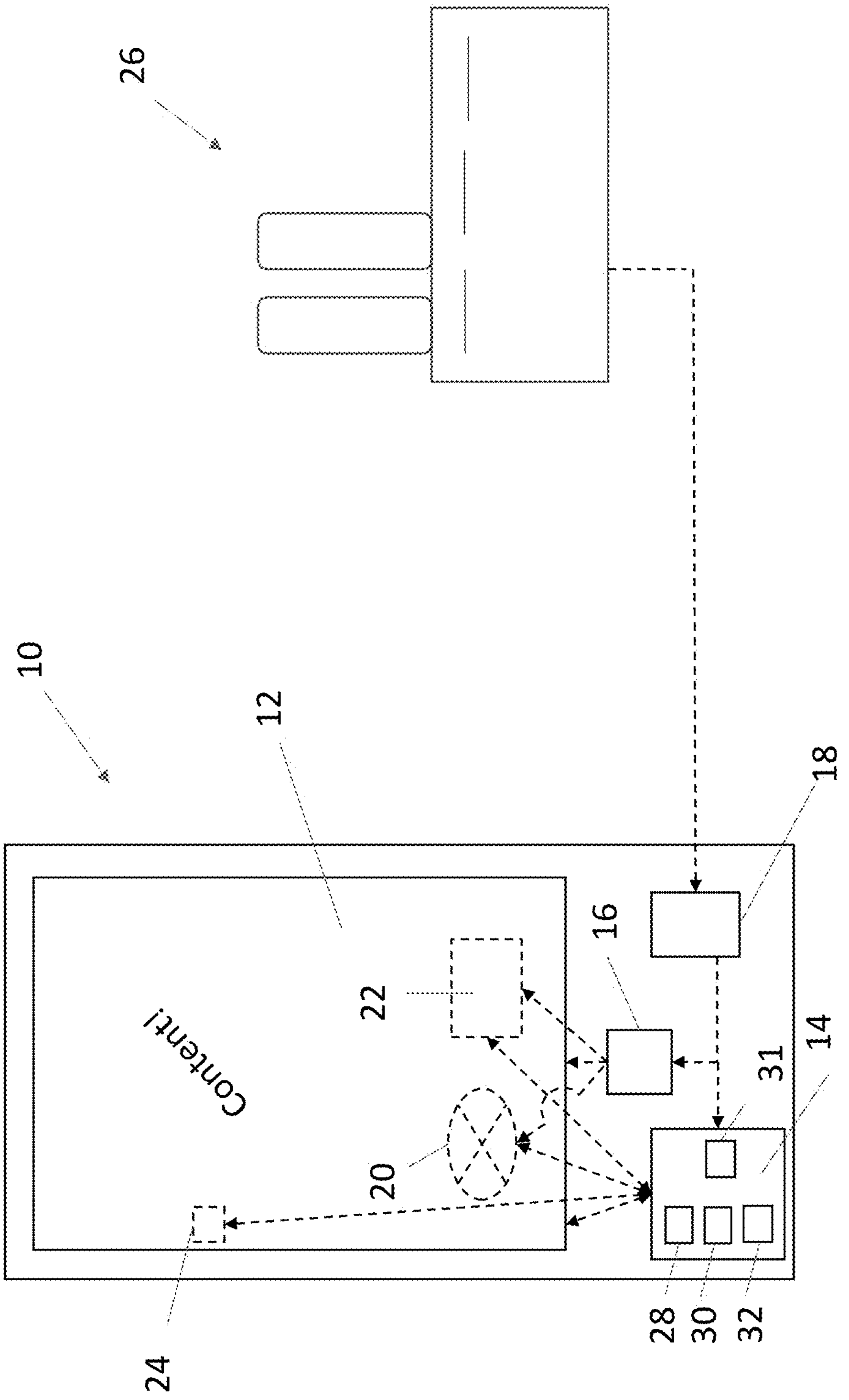
FIG. 1 is a simplified plan view of an exemplary unit with automated power governing features and related system components.

FIG. 1 illustrates an exemplary outdoor display unit 10 (hereinafter "unit" for brevity). The unit 10 may include one or more electronic displays 12 (hereinafter also "display" for brevity). Each electronic display 12 may include liquid crystal displays (LCDs), organic light emitting diode displays (OLED), light emitting diode (LED) displays, plasma displays, cathode ray tube displays, rear projection displays, combinations thereof, or the like. Each electronic display 12 may include one or more backlights, such as direct backlights, edge lighting, combinations thereof, or the like. Each display 12 may not require a separate backlight, such as in the case of OLEDs, which are self-illuminating.

The units 10 may include one or more thermal management systems 20. The thermal management systems 20 may comprise one or more fans, open loop airflow pathways, closed loop airflow pathways, thermoelectric modules, air conditioning units, sensors 24, combinations thereof, or the like. The thermal management systems 20 may be, for example, without limitation, as shown and/or described in one or more of: U.S. Pat. No. 9,629,287 granted Apr. 18, 2017 entitled SYSTEM FOR USING CONSTRICTED CONVECTION WITH CLOSED LOOP COOLING SYSTEM AS THE CONVECTION PLATE, U.S. Pat. No. 10,506,738 granted Dec. 10, 2019 entitled CONSTRICTED CONVECTION COOLING FOR AN ELECTRONIC DISPLAY, U.S. Pat. No. 11,540,418 granted Dec. 27, 2022 entitled ELECTRONIC DISPLAY WITH COOLING, and/or U.S. Pat. No. 11,032,923 granted Jun. 8, 2021 entitled FIELD SERVICEABLE DISPLAY ASSEMBLY, the disclosures of each of the foregoing being hereby incorporated by reference as if fully restated herein. Other types and/or kinds of thermal management systems 20 may be utilized.

The units 10 may include one or more additional electricity consuming components 22, such as but not limited to, radio transmitters/receivers (e.g., "5G" wireless equipment), cameras, touchscreens, sensors, servers, sensors 24, combinations thereof, or the like.

The units 10 may comprise one or more sensors 24. The sensors 24 may comprise temperature sensors, pressure sensors, air quality sensors, air flow sensors, location detection devices, light sensors, color sensors, combinations thereof, or the like. Any number and/or type of sensors 24 may be provided at any number of locations within the units 10.

The control subsystem 14 may be configured to adjust electronic display 12 illumination (e.g., backlight, OLED) based on sensed ambient lighting conditions, such as by way of the one or more sensors 24. In exemplary embodiments, without limitation, the control subsystem 14 may be configured to normally increase the power level of the electronic displays 12 under relatively high ambient light conditions to provide increased image visibility. In exemplary embodiments, without limitation, the control subsystem 14 may be configured to normally decrease the power level of the electronic displays 12 under relatively low ambient light conditions to save power. Such components and/or operations may be, for example, without limitation, as shown and/or described in U.S. Pat. No. 10,440,790 granted Oct. 8, 2019 entitled ELECTRONIC DISPLAY SYSTEM WITH ILLUMINATION CONTROL, the disclosures of which are hereby incorporated by reference as if fully restated herein. Other components and/or methods of control may be utilized.

The electronic displays 12, thermal management systems 20, additional electricity consuming components 22, sensors 24, combinations thereof, or the like may be in electronic communication with a control subsystem 14, which may receive data therefrom and/or provide operational commands to such components.

The control subsystem 14 may, additionally or alternatively, be in electronic communication with a power subsystem 16. The power subsystem 16 may comprise one or more power supplies (e.g., DC power supplies), power transformers, power regulation components, capacitors, bulk energy storage devices (e.g., batteries), power converters (e.g., AC/DC converters), switches, combinations thereof, or the like. The power subsystem 16 may be electrically interposed between some or all electricity consuming components of the unit 10 (e.g., electronic displays 12, thermal management systems 20, additional electricity consuming components 22, sensors 24, combinations thereof, or the like) and a power source 26 (e.g., external utility power supply).

Alternatively, or additionally, the control subsystem 14 may be electrically interposed between some or all electricity consuming components of the unit 10 (e.g., electronic displays 12, thermal management systems 20, additional electricity consuming components 22, sensors 24, combinations thereof, or the like) and the power source 26. The power source 26 may comprise one or more external utility power supplies, such as power generation facilities (e.g., power plants), utility lines, and/or power grids, bulk energy storage devices (e.g., batteries), local power supplies (e.g., wind power, portable or fixed power generators, solar power, combinations thereof, or the like), combinations thereof, or the like. One or more power sources 26 may be available (e.g., solar power with backup utility power). The power sources 26 may be external to the units 10. In at least the case of solar power and/or bulk energy storage devices, some or all of the power sources 26, or components thereof, may be, in whole or in part, internal to the unit 10.

Alternatively, or additionally, a power overload prevention subsystem 18 may be electrically interposed between some or all electricity consuming components of the unit 10 (e.g., electronic displays 12, thermal management systems 20, additional electricity consuming components 22, sensors 24, combinations thereof, or the like) and the power source 26. The power overload prevention subsystem 18 may comprise one or more circuit breakers, fuses, combinations thereof, or the like.

The control subsystem 14 may comprise, or be in electronic communication with (such as, by way of non-limiting example, provided at the power subsystem 16 or otherwise) one or more of: an AC power governor 28, DC power governor 30, and thermal governor 32 (collectively the "governors" for brevity). One or more of the governors may be independent components, part of the control subsystem 14, part of the power subsystem 16, combinations thereof, or the like. One or more of the governors may comprise hardware components, such as but not limited to, processors, electronic storage devices, computing devices, switches, power transformers, power limiters, power regulators, combinations thereof, or the like, and/or software components, such as but not limited to, software code, variables, algorithms, operational command subroutines, combinations thereof, or the like.

The control subsystem 14, power subsystem 16, and one or more of the governors may comprise one or more power meters and/or simulated power meters, such as shown and/or described in one or more of, and/or use one or more of the techniques shown and/or described in: U.S. Pat. No. 11,022,635 granted Jun. 1, 2021 entitled MEASURING POWER CONSUMPTION OF AN ELECTRONIC DISPLAY ASSEMBLY. Such power meters and/or simulated power meters and/or related techniques may serve as sensor(s) 24, though such is not required.

The control subsystem 14 may comprise, or be in electronic communication with, one or more network communication devices, such as for wired and/or wireless transmission and/or receipt of data. Such data may include data regarding unit 10 operation, commands, protocols, software, and/or thresholds, combinations thereof, or the like. The network communication devices may be configured to facilitate electronic communication by way of one or more internets, intranets, cellular networks, combinations thereof, or the like.

The units 10 may comprise one or more internal support frameworks, external housings, cover panels, ventilation systems, filters, openings, combinations thereof, or the like, and may be provided in a variety of sizes, shapes, and/or configurations. Some or all of the components of the units 10 shown and/or described may be internal to the units 10 and/or external thereto.

Figure 2:
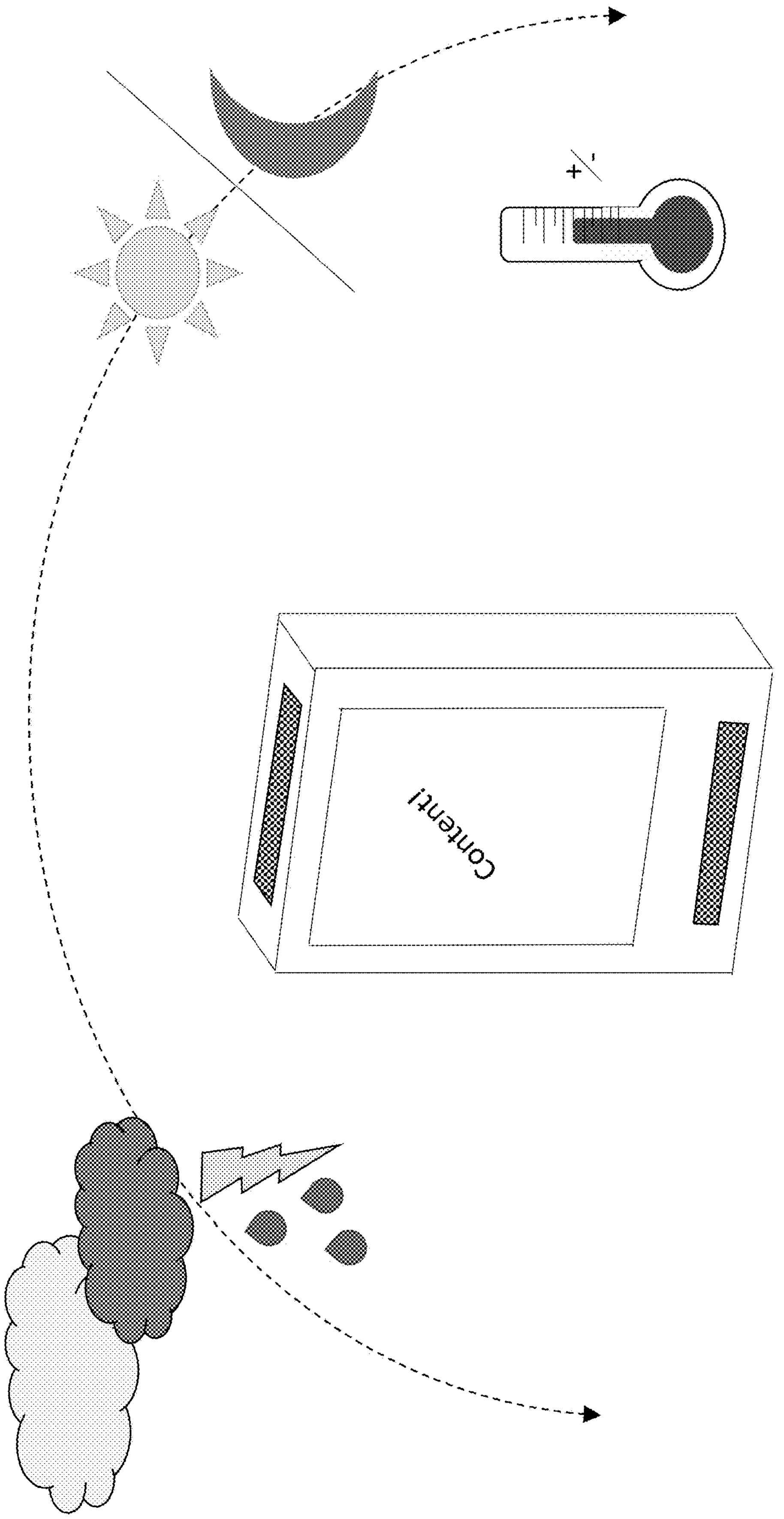
FIG. 2 is a simplified perspective view of the unit of FIG. 1 in an exemplary environmental operation context.

As illustrated with particular regard to FIG. 2, a large variety of ambient weather and other operating conditions experienced by the units 10 may result in drastic fluctuations to unit 10 needs and/or operational characteristics, such as thermal management subsystem 20 demands, experienced temperatures (e.g., due to ambient temperatures, solar loading, solar angle, seasonal changes, weather patterns, combinations thereof, or the like), ambient lighting conditions (e.g., sun and moonlight movement, shade, cloud cover, precipitation, seasonal changes, combinations thereof, and the like) and resulting need to alter electronic display 12 illumination levels to render image sufficiently visible, combinations thereof, or the like. By way of non-limiting example, relatively warm temperatures and/or high solar loading may increase demand on the thermal management subsystem 20 for cooling and/or desire for increased illumination levels of the electronic displays 12 for image visibility, resulting in relatively high electrical demand on the unit 10 and/or high internal temperature levels, thereby pushing the unit 10 to the extremes of its operating abilities. Changing global weather patterns and extreme weather events may contribute to such extreme conditions. The automated power governing features shown and/or described herein may assist with managing the unit 10 such that the most extreme of such conditions, reducing the need to otherwise significantly engineer the units 10 for such unlikely or rare events. This may reduce design complexity and unit 10 cost while improving reliability and user experience. The illustrated and/or described examples of operating conditions are merely exemplary and not intended to be limiting.

Figure 3:
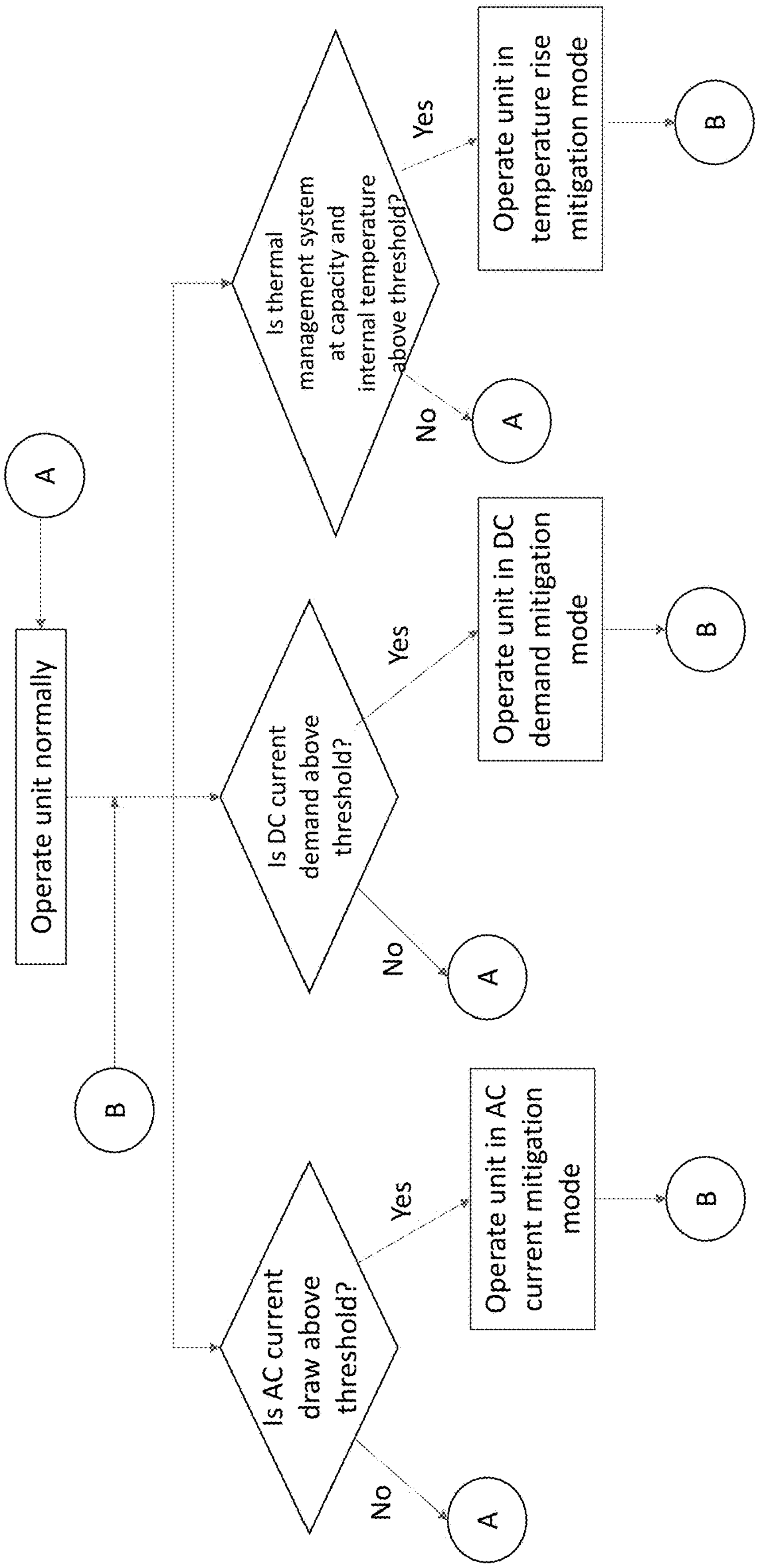
FIG. 3 is a flow chart with exemplary logic for operating the unit of FIG. 1, such as when operating in the various environmental operation conditions illustrated by FIG. 2.

FIG. 3 provides exemplary logic for operating the unit 10, such as during the various exemplary operating conditions of FIG. 2. The control subsystem 14 may operate the unit 10 normally. Such normal operations may include, for example, without limitation, displaying content at the electronic displays 12, adjusting illumination of the electronic displays 12, such as in response to ambient light readings taken by one or more of the sensors 24, operating the thermal management subsystem 20, such as by running fans at various speeds based on temperature readings taken by one or more of the sensors 24, operating customer or peripheral equipment, such as providing wayfinding information, telephonic, voice, and/or video calls, operating wireless "hotspots", receiving and/or processing information from the additional electronic equipment 22, such as cameras, combinations thereof, or the like. These are merely exemplary and not intended to be limiting.

While undertaking normal operations, the control subsystem 14 may monitor one or more operating conditions of the unit 10, such as by way of the sensors 24, thermal management subsystem 20, and/or power subsystem 16. In exemplary embodiments, without limitation, the AC governors 28 may periodically, continuously, randomly, combinations thereof, or the like, monitor AC current draw; the DC governor 30 may periodically, continuously, randomly, combinations thereof, or the like, monitor DC current draw; the thermal governor 32 may periodically, continuously, randomly, combinations thereof, or the like, monitor temperatures (e.g., by way of one or more sensors 24) and thermal management subsystem 20 operations, respectively. Each unit 10 may comprise one, some, or all of the governors 28, 30, 32 in a same or different combination.

Where the AC governor 28 determines that AC current draw is above a predetermined threshold, the AC governor 28 may initiate a current draw mitigation mode. The predetermined threshold may be between 70-99% of the service rated expected installed AC power, though any threshold may be utilized. The current draw mitigation mode may comprise initiating a subroutine which comprises issuing commands, such as by way of the control subsystem 14, to the electronic displays 12 to rapidly, such as in a matter of seconds or less than 1 second, begin reducing illumination levels of the electronic displays 12, such as by dimming the backlight. This may reduce or prevent nuisance tripping of circuit breakers, such as at the power overload prevention subsystem 18. In this way, the current draw mitigation mode may replace and/or override the normal operations. The unit 10 may remain in the current draw mitigation mode until AC current draw is below the predetermined threshold, such as by at least a margin to prevent continued movement between normal operation mode and current draw mitigation mode. Where the AC governor 28 determines that AC current draw is below the predetermined threshold, the AC governor 28 continue with normal operations.

The AC governor 28, control subsystem 14, and/or power subsystem 16 may monitor current supplied, such as on a continual, periodic, and/or random basis. Where the current draw is below an expected level, an electronic notification may be automatically generated and transmitted, such as by way of one or more network communication devices, to one or more remote electronic devices (e.g., computers, smart phones, tablets, servers, etc.). The network communication devices and transmission may be made by way of one or more internets, intranets, cellular networks, combinations thereof, or the like.

Expected power supply levels, including current supply levels, may vary based on unit 10 configuration, such as size, number, and/or type of the electronic displays 12 installed, anticipated driving levels for the electronic displays 12, other equipment 22 installed, expected ambient conditions, combinations thereof, and the like. Such power consumption levels may vary from approximately 200 watts to 5000+ watts, though any power level may be expected. Such expected current may vary from less than 2 amps to over 25 amps, though any current level may be expected. Circuit breakers may be configured to trip at less than 5 amps to over 30 amps, though any threshold may be utilized. These are provided by way of non-limiting example.

Actual power supplied may vary based on power source 26 type and/or operational fluctuations, economic issues (e.g., operator unable or unwilling to pay for certain power supply at peak times, by way of non-limiting example), combinations thereof, or the like.

Where the DC governor 30 determines that DC current demand is above a predetermined threshold, the DC governor 30 may initiate a power demand mitigation mode. The predetermined threshold may be reflective of limits of one or more installed power supplies, such as forming part of the power subsystem 16. The predetermined threshold may be between 80-100% of the limits of the one or more installed power supplies, though any amount may be utilized. The power demand mitigation mode may comprise initiating a subroutine which comprises issuing commands, such as by way of the control subsystem 14, to the electronic displays 12 to at a relatively moderate pace, such as in a matter of seconds (e.g., between 3-60 seconds) or minutes, begin reducing illumination levels of the electronic displays 12, such as by dimming the backlight. This may reduce or prevent the one or more power supplies from reaching their maximum limit and turning off. In this way, the power demand mitigation mode may replace and/or override the normal operations. The unit 10 may remain in the power demand mitigation mode until DC current demand is below the predetermined threshold, such as by at least a margin to prevent continued movement between normal operation mode and power demand mitigation mode. Where the DC governor 30 determines that DC current demand is below the predetermined threshold, the DC governor 30 may continue with normal operations.

If the one or more power supplies reach their current limit, they may be configured to automatically shut off and be restarted.

Where the thermal governor 32 determines that the thermal management subsystem 20 is operating at a predetermined capacity threshold and internal temperatures, such as determined by the one or more sensors 24, are above a predetermined temperature threshold, the thermal governor 32 may initiate a temperature rise mitigation mode. Stated another way, the thermal management subsystem 20 may be performing at a maximum level for heat removal or some threshold thereof. For example, without limitation, the predetermined capacity threshold may be between 80-100% of the capacity of the thermal management subsystem 20 (e.g., fans operating at 80-100% of maximum speed), though any amount may be utilized. The predetermined temperature threshold may be the same or different for each sensor 24, such as based on location and/or tolerance of local components. In exemplary embodiments, without limitation, the internal temperature condition for entering the temperature rise mitigation mode may be met where any one of the internal temperatures are above the predetermined temperature threshold and/or the respective predetermined temperature threshold for the sensor 24. In other exemplary embodiments, without limitation, a plurality, or all, of the internal temperatures are above the predetermined temperature threshold and/or the respective predetermined temperature threshold for the sensor 24 before the temperature conditions for entering the temperature rise mitigation mode are met.

The temperature rise mitigation mode may comprise initiating a subroutine which comprises issuing commands, such as by way of the control subsystem 14, to the electronic displays 12 at a relatively slow pace, such as in a matter of minutes (e.g., between 5-60 minutes), begin reducing illumination levels of the electronic displays 12, such as by dimming the backlight, such as down to a zero level. This may reduce or prevent damage to temperature sensitive components of the unit 10. In this way, the temperature rise mitigation mode may replace and/or override the normal operations. The unit 10 may remain in the temperature rise mitigation mode until the internal temperatures and/or thermal management subsystem 20 capacity is below the respective predetermined thresholds, such as by at least a margin to prevent continued movement between normal operation mode and temperature rise mitigation mode. Where the thermal governor 32 determines that internal temperatures and/or thermal management subsystem 20 capacity are below the predetermined threshold, the thermal governor 32 may continue with normal operations.

These governors 28, 30, and 32 may be particularly important for preventing shut down of the units 10 and/or related components, such as the thermal management subsystems 20 which, if shut down, particularly in a moment of existing extreme operating conditions, may trigger a rapid rise in internal temperatures and comprise of the units 10. Thus, the governors 28, 30, and 32 and related operations may serve to maintain operations of the unit 10, such as the thermal management subsystem 20, and/or minimize disruption to user experiences.

The various predetermined thresholds and/or criteria for the governors 28, 30, and/or 32 may be set and/or varied by programming, such as by way of receipt of authenticated change commands from one or more remote electronic devices.

The governors 28, 30, and/or 32 may operate independently from one another, in exemplary embodiments without limitation. The analysis undertaken by each of the governors 28, 30, and/or 32 may be performed in parallel and/or in any sequence.

The integrated power governing features may alternatively, or additionally, permit the reduction in power supplies, such as of the power subsystem 16, for a unit 10 and/or reduce power consumption for a unit 10, among other benefits. This may allow provided power supplies, such as of the power subsystem 16, to operate closer to maximum capacity, whereby increased efficiencies are generally found, thereby increasing operational efficiency of the unit 10 and reducing costs of manufacture, among other benefits.

Figure 4:
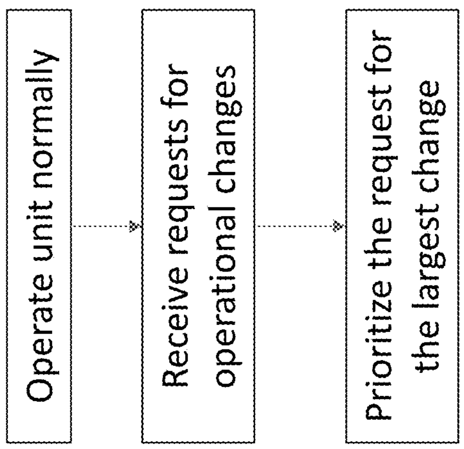
FIG. 4 is a flow chart with other exemplary logic for operating the unit of FIG. 1, such as when operating in the various environmental operation conditions illustrated by FIG. 2 and/or in conjunction with the logic of FIG. 3.

As illustrated with particular regard to FIG. 4, requests for operational changes may be prioritized and/or centralized for disposition. For example, without limitation, operational change requests made by the governors 28, 30, and/or 32 may be centrally dispositioned, such as at the control subsystem 14. Alternatively, or additionally, the governors 28, 30, and/or 32 may be in intercommunication and/or communication with a particular one of the governors 28, 30, and/or 32 which may be designated for arbitrating and/or prioritizing incoming requests. Where multiple requests for operational changes are received, such as from the different governors 28, 30, and/or 32 at the control subsystem 14, the control subsystem 14 or other dispositioning unit (e.g., designated one of the governors 28, 30, and/or 32) may be configured to prioritize the requests based on an amount of operational adjustment requested. For example, the largest operational change may be prioritized over the other requests. In exemplary embodiments, this may require acting on the request which results in the largest power and/or electronic display 12 illumination level reduction.

The remaining requests may be discarded, ignored, and/or placed on hold. The remaining requests may be acted on subsequently, such as when the particular request being acted on is no longer valid, and/or the requests may be discarded as the various requests become no longer valid. For example, without limitation, the highest prioritized request may comprise the largest illumination level reduction which may be sufficient to request the lower-level requests. As another example, without limitation, once the highest prioritized request is performed for a period of time, the request may drop off due to sufficient changes to operational conditions that render the request no longer needed, and the control subsystem 14, for example, may move to a secondary request, tertiary request, etc. which remain valid based on updated operating conditions.

While three specific governors 28, 30, and/or 32 may be utilized in exemplary embodiments, one or more additional governors 31 may optionally be utilized in place of, or in addition to, the governors 28, 30, and/or 32. For example, without limitation, one of the additional governors 31 may be configured to trigger electronic display 12 dimming and/or other power consumption reduction efforts where one or more operational failures in the thermal management system 20 are detected. For example, without limitation, where one or more fan failures are detected. Such operational failures may be detected through lack of signal response, lack of power supply, combinations thereof, or the like. In other exemplary embodiments, without limitation, one of the additional governors 31 may be configured to trigger electronic display 12 dimming and/or other power consumption reduction efforts where external power supply changes or ceases, such as from one or more solar panels, utility power supplies, wind turbines, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like, configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold solely non-transitory signals.

What is claimed is:

1. A display unit with automated power governing features, said display unit comprising:
- one or more electronic displays;
- a power subsystem electrically connected to the one or more electronic displays;
- one or more temperature sensors;
- a thermal management subsystem; and
- a control subsystem in electronic communication with the power subsystem, the one or more temperature sensors, and the thermal management subsystem, where the control subsystem comprises: an alternating current (AC) governor, a direct current (DC) governor, and a thermal governor, wherein said control subsystem comprises one or more electronic storage devices with software instructions, which when executed, configure one or more processors to:
  - monitor AC power draw by way of the power subsystem;
  - where the AC power draw exceeds a current draw predetermined threshold, reduce, by way of the power subsystem and at a relatively rapid pace, power levels of the one or more electronic displays;
  - monitor DC power demand by way of the power subsystem;

where the DC power demand exceeds a predetermined power demand threshold, reduce, by way of the power subsystem and at a relatively moderate pace, power levels of the one or more electronic displays;

monitor temperatures by way of the one or more temperature sensors;

monitor capacity levels of the thermal management subsystem; and where at least one of the temperatures exceeds a predetermined temperature threshold and the capacity levels exceed a predetermined capacity threshold, reduce, by way of the power subsystem and at a relatively slow pace, power levels of the one or more electronic displays.

2. The display unit of claim 1 wherein:

the power subsystem is electrically interposed between an external utility power supply and all electricity consuming equipment of the display unit and comprises an actual or simulated electric meter.

3. The display unit of claim 1 further comprising:

a power overload prevention subsystem comprising one or more circuit breakers interposed between an internal power supply for the display unit and the power subsystem, wherein the current draw predetermined threshold is 80% of a trip threshold for the one or more circuit breakers.

4. The display unit of claim 1 wherein:

the power subsystem comprises multiple DC power supplies; and the predetermined power demand threshold is at least 90% of a capacity of the multiple DC power supplies.

5. The display unit of claim 1 wherein:

the predetermined power demand threshold is at least 90% of a maximum capacity for the thermal management subsystem.

6. The display unit of claim 5 wherein:

the predetermined temperature threshold is different for each of the one or more temperature sensors.

7. The display unit of claim 5 wherein:

the thermal management subsystem comprises at least one fan; and the predetermined capacity threshold is determined by a speed of the at least one fan.

8. The display unit of claim 1 wherein:

the relatively rapid pace is less than one second;

the relatively moderate pace is between 5 and 60 seconds; and the relatively slow pace is multiple minutes.

9. The display unit of claim 1 wherein:

the one or more electronic displays each comprise a directly backlit liquid crystal display (LCD); and the thermal management subsystem comprises at least one airflow pathway and at least one fan.

10. The display unit of claim 1 wherein:

the control system is configured to monitor, by way of the power subsystem, AC power input and generate and transmit an electronic notification where the AC power input is less than an expected amount by at least a margin.

11. The display unit of claim 1 wherein:

the AC governor is configured to restore normal operations where the AC power draw falls below the current draw predetermined threshold by at least an AC power draw margin;

the DC governor is configured to restore normal operations where the DC power demand falls below the predetermined power demand threshold by at least a DC power demand margin; and the thermal governor is configured to restore normal operations where the temperatures fall below the predetermined temperature threshold or the capacity levels fall below the predetermined capacity threshold by at least a respective margin.

12. A display unit with automated power governing features, said display unit comprising:

one or more electronic displays;

a power subsystem electrically connected to the one or more electronic displays;

one or more temperature sensors;

a thermal management subsystem; and a control subsystem in electronic communication with the power subsystem, the one or more temperature sensors, and the thermal management subsystem, where the control subsystem comprises at least one of: an alternating current (AC) governor, a direct current (DC) governor, and a thermal governor, wherein said control subsystem comprises one or more electronic storage devices with software instructions, which when executed, configure one or more processors to:

where the AC governor is provided:

monitor AC power draw by way of the power subsystem; and where the AC power draw exceeds a current draw predetermined threshold, reduce, by way of the power subsystem and at a relatively rapid pace which is less than one second, power levels of the one or more electronic displays;

where the DC governor is provided:

monitor DC power demand by way of the power subsystem; and where the DC power demand exceeds a predetermined power demand threshold, reduce, by way of the power subsystem and at a relatively moderate pace which is between 5 and 60 seconds, power levels of the one or more electronic displays; and where the thermal governor is provided:

monitor temperatures by way of the one or more temperature sensors;

monitor capacity levels of the thermal management subsystem; and where at least one of the temperatures exceeds a predetermined temperature threshold and the capacity levels exceed a predetermined capacity threshold, reduce, by way of the power subsystem and at a relatively slow pace which is multiple minutes, power levels of the one or more electronic displays.

13. A display unit with automated power governing features, said display unit comprising:

one or more electronic displays;

a power subsystem electrically connected to the one or more electronic displays;

one or more temperature sensors;

a thermal management subsystem; and a control subsystem in electronic communication with the power subsystem, the one or more temperature sensors, and the thermal management subsystem, where the control subsystem comprises at least an alternating current (AC) governor, wherein said control subsystem comprises one or more electronic storage devices with software instructions, which when executed, configure one or more processors to cause the AC governor to:

monitor AC power draw by way of the power subsystem;

where the AC power draw exceeds a current draw predetermined threshold, reduce, by way of the power subsystem, power levels of the one or more electronic displays; and monitor, by way of the power subsystem, AC power input and generate and transmit an electronic notification where the AC power input is less than an expected amount by at least a margin.

14. The display unit of claim 13 wherein:

said one or more electronic storage devices comprise additional software instructions, which when executed, configure said one or more processors to cause the AC governor to reduce, by way of the power subsystem, the power levels of the one or more electronic displays in less than one second.

15. A display unit with automated power governing features, said display unit comprising:

one or more electronic displays;

a power subsystem comprising multiple direct current (DC) power supplies electrically connected to the one or more electronic displays;

one or more temperature sensors;

a thermal management subsystem; and a control subsystem in electronic communication with the power subsystem, the one or more temperature sensors, and the thermal management subsystem, where the control subsystem comprises at least a DC governor, wherein said control subsystem comprises one or more electronic storage devices with software instructions, which when executed, configure one or more processors to cause the DC governor to:

monitor DC power demand by way of the power subsystem; and where the DC power demand exceeds a predetermined power demand threshold, reduce, by way of the power subsystem, power levels of the one or more electronic displays, where said predetermined power demand threshold is at least 90% of a capacity of the multiple DC power supplies.

16. The display unit of claim 15 wherein:

said one or more electronic storage devices comprise additional software instructions, which when executed, configure said one or more processors to cause the DC governor to reduce, by way of the power subsystem, the power levels of the one or more electronic displays in an amount of time between 5 and 60 seconds.

* * * * *